May 18, 1965     H. A. PAYNE     3,184,106

ADJUSTABLE, SIPHON-TYPE LIQUID DISPENSER

Filed Oct. 9, 1963

INVENTOR.

HAROLD. A. PAYNE.

BY *Featherstonhaugh & Co*

3,184,106
ADJUSTABLE, SIPHON-TYPE LIQUID DISPENSER
Harold A. Payne, 252 Bering Ave., Toronto,
Ontario, Canada
Filed Oct. 9, 1963, Ser. No. 315,090
1 Claim. (Cl. 222—46)

This invention relates to an improvement in a siphoning liquid dispenser.

Siphoning liquid dispensers in which the quantity of liquid dispensed is a function of the projection of a siphoning tube into a measuring chamber are well known. They comprise the subject matter of issued United States Patent Nos. 2,193,043 dated March 12, 1940; 2,209,947 dated August 6, 1940; and 3,097,769 dated July 16, 1963. The latter patent is directed to the provision of means for manually varying the projection of the siphoning tube into the siphoning chamber to vary the amount of liquid dispensed by the device. It constitutes a substantial advance over the disclosures of the first two mentioned patents which had no means for varying the amount of liquid dispensed by the device. However, it is subject to the disadvantage that it does not have an easy to read means for indicating the setting of the siphoning tube in the measuring chamber to indicate the amount that will be dispensed for each setting. It is true that U.S. Patent 3,097,769 disclosed rings on the external projection of the siphoning tube which can be used as an indication of the amount that will be dispensed. These rings, however, are very difficult to mark clearly and they are not easy to read.

This invention provides an easy to read means for indicating the amount of liquid that the device will dispense for any given extension of the siphon tube into the measuring chamber and it comprises a dial on the bulb of the device and a pointer for the dial that is carried by the adjusting knob and is adapted to move across the dial as the knob is rotated. Limit means are provided for limiting the rotational movement of the knob to not more than 360 degrees. The dial is calibrated so that the position of the pointer thereon indicates the projection of the siphon tube in the measuring chamber and hence the amount of liquid dispensed for each that particular setting. The invention will be clearly understood after reference to the following detailed specification read in conjunction with the drawings.

Figure 1:
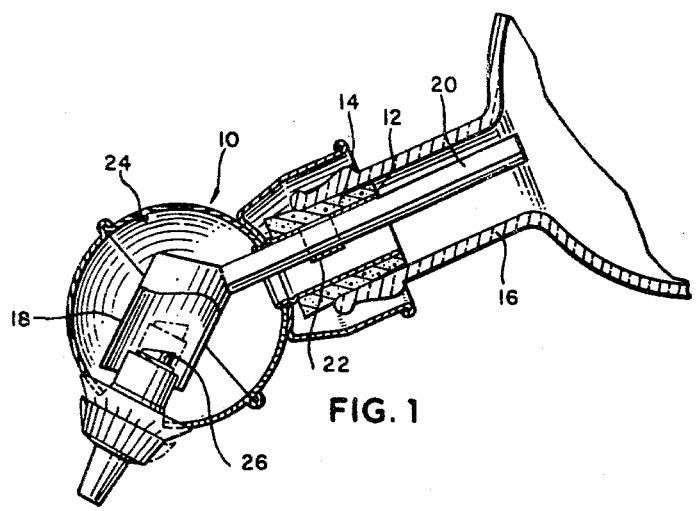
FIGURE 1 is a view of a dispenser according to this invention fitted into the neck of a bottle.

Referring to the drawings, the dispenser there shown comprises a bulb 10 having a neck 12 with a cork collar 14 thereon that is adapted to fit into the neck 16 of a bottle as shown. A measuring cup or chamber 18 has a vent tube 20 extending from its bottom and is rigidly mounted in the bulb 10 by means of the clamp 22. The bulb 10 is vented to the atmosphere as at 24 and the size of the opening at the bottom of vent tube 20 is controlled as is well known in the art to achieve the desired siphoning effect.

The siphon tube 26 which enters into the measuring chamber 18 controls, by its relative projection into the chamber, the amount of liquid dispensed each time of operation of the device.

Figure 3:
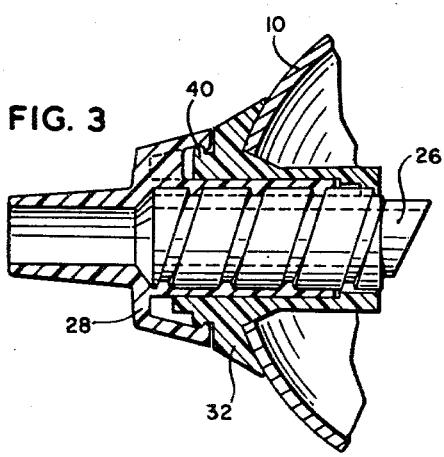
FIGURE 3 is a partial sectional view of a dispenser according to this invention.

The projection of siphon tube 26 into the measuring chamber 18 is manually adjustable. In this connection, it will be noted that siphon tube 26 is exteriorly threaded and threadedly engages in the threaded back end of the knob 28, as illustrated in FIGURE 3. Sleeve 32, within which knob 28 is rotatably mounted, has a lug 34 that engages in the longitudinally extending slot 36 of siphon tube 26. Sleeve 32 is rigidly mounted on the bulb 10. Knob 28 has an in-turned flange 38 that can be sprung to enter into the broken circumferentially extending groove formed by ridges 40, as indicated in FIGURE 3, whereby to rotatably mount the knob 28 in the sleeve 32. Sleeve member 32 and knob 28 are each formed with a stop member 42 and 44, respectively, which co-operate with each other to limit the rotation of the knob with respect to sleeve to slightly less than 360°, as will be referred to later. Lug 34 on sleeve 32 aligns with slot 36 in siphon tube 26 to prevent relative rotation between the sleeve and the siphon tube.

Thus far, it will be apparent that, with rotation of the knob 28 in sleeve 32, the siphon tube 26 will be extended or retracted with respect to the measuring cup 18 depending on the direction of rotation of the knob as slot 36 slides over lug 34.

The thread on siphoning tube 32 and knob 28 each have a pitch such that the required range of projection of the siphoning tube with respect to the measuring chamber can be achieved by rotating the knob between the limits permitted by the stops 42 and 44. A dial 46 formed on a flange of the sleeve 32 that is, in turn, rigidly mounted on the bulb 10 is provided and a pointer 48 on knob 28 travels across the dial as the knob is turned between the stop members 42 and 44. Thus, the position of the siphoning tube 26 is related by the position of the pointer 48 on the dial 46 so that the dial, when calibrated, indicates the position of the siphoning tube 26. Dial 46 is calibrated in fluid ounces. Thus, when pointer 48 is at numeral 1 on dial 46, the siphoning tube 26 is located in relation to the measuring cup to dispense one ounce. When the pointer points to 2, two ounces will be dispensed.

The assembly of the device is apparent from the drawings. The siphon tube 26 is threaded into the knob 28 and the sleeve 32 is projected onto the knob to cause the flange 38 to spring over the ridges 30. Lug 34 aligns with slot 36 in the siphon tube 26 to prevent relative rotation and the stops 42 and 44 are in contact with each other as the pointer on the dial indicates a maximum reading with the sleeve fully retracted.

The siphoning operation of the device is well known. Briefly, as the bottle is tipped, liquid enters bulb 12 and measuring chamber 18. When the level of liquid in chamber 18 reaches the upper end of siphoning tube 26, the free supply of air to the inside of the bottle through vent tube 20 is cut off. This generates a siphoning action and liquid starts to run out of the siphoning tube 26 and then aligned through opening in the knob 28. It also stops all inflow of air to the bottle which holds back the liquid in the bottle until the siphoning action is broken when the liquid level in the bulb reaches the bottom edge of the measuring chamber 18 which allows air to enter the bottle from the inside of the bulb. Vent hole 50 admits atmospheric pressure to the bulb.

Thus, the siphoning action starts soonest when the siphoning tube 26 projects the smallest amount into the measuring chamber 18 and the smallest amount is dispensed. This is the solid line position of the tube 26 shown in FIGURE 1 and would correspond to the pointer 48 position at minimum reading on the dial 46. A greater projection of the siphoning tube dispenses less liquid and is shown by dotted line position in FIGURE 1. The dial and device illustrated dispense between one and two ounces.

Figure 2:
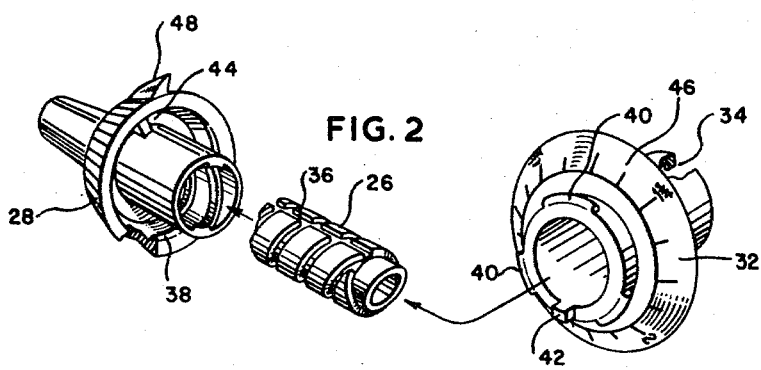
FIGURE 2 is an exploded view of a dispenser according this invention.
Figure 4:
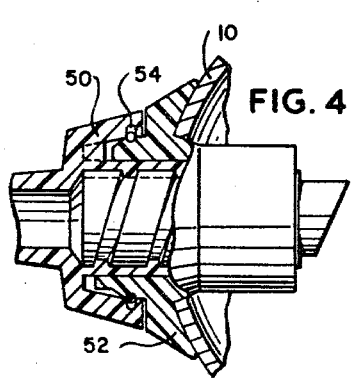
FIGURE 4 is a view similar to FIGURE 3 showing an alternative way of mounting the dial on the neck.

FIGURE 4 shows an alternative way of securing the dial 50 to the sleeve 52 which comprises a steel ring 54 that engages grooves in the dial and sleeve according to known practice. Otherwise, the device of FIGURE 4 is the same as the one of FIGURES 1 to 3.

The invention is capable of considerable variation and it is not intended that it should be restricted to the foregoing specific description.

What I claim as my invention is:

A device for dispensing liquid in predetermined amounts from a bottle comprising a bulb adapted to receive liquid from a bottle, a measuring chamber in said bulb, a siphoning tube carried by said bulb, one end of said siphoning tube projecting into said measuring chamber, means for varying the projection of said siphoning tube into said measuring chamber over a range whereby a predetermined amount of liquid dispensed by said device can be varied, said latter mentioned means comprising a knob rotatably mounted with respect to said bulb, said knob being formed with a through opening having a first end and a second end, said first end of said through opening terminating in a spout that is exterior of said bulb, at least a portion of the through opening of said knob being threaded, said siphoning tube being in threaded engagement in said threaded portion of said knob and extending beyond the second end of the through opening, means for preventing said siphoning tube from rotating about its own longitudinal axis as said knob is rotated whereby with rotation of said knob the projection of said siphoning tube into or out of said measuring chamber can be varied, a dial on said bulb, a pointer for said dial carried by said knob and adapted to move across said dial as said knob is rotated, limit means for limiting the rotational movement of said knob to not more than 360°, said siphoning tube being threaded as aforesaid with a thread having a pitch adapted to give said range of variation of projection of said siphoning tube into said measuring cup in response to rotational movement of said knob as limited by said limit means, and calibrations on said dial related to the projection of said siphoning tube in said measuring cup whereby said pointer by its position on said dial indicates the amount of liquid dispensable by said device for any setting of said pointer on said dial.

References Cited by the Examiner

UNITED STATES PATENTS 941,253 11/09 Hood ---------------- 222—46
2,163,974 6/39 Blett ---------------- 222—46

FOREIGN PATENTS 609,012 11/60 Canada.

LOUIS J. DEMBO, *Primary Examiner*.